United States Patent Office 3,225,060
Patented Dec. 21, 1965

3,225,060
BIS-HYDANTOINS AND A METHOD FOR THE PREPARATION THEREOF
Herbert E. Johnson, South Charleston, W. Va., assignor to Union Carbide Corporation, a corporation of New York
No Drawing. Filed July 6, 1961, Ser. No. 122,072
12 Claims. (Cl. 260—309.5)

This invention relates to bis-hydantoins. More particularly, this invention relates to 1,1'-alkylene bis-hydantoins and to a method for the preparation thereof.

It has been previously proposed to prepare 1,1'-methylene bis-hydantoins by reacting a hydantoin with formaldehyde in a reaction medium containing hydrochloric acid and a metal halide, such as zinc chloride. This method, although suitable for the preparation of 1,1'-methylene bis-hydantoins, cannot be used for the preparation of 1,1'-alkylene bis-hydantoins wherein the alkylene group is other than methylene. Aldehydes, other than formaldehyde, which are the source of the alkylene group linking the hydantoin groups, are not stable in an acid medium and therefore do not react with hydantoins to give the desired product.

The present invention provides a method for the preparation of 1,1'-alkylene bis-hydantoins in general and is not limited to the preparation of 1,1'-alkylene bis-hydantoins wherein the alkylene group is only methylene. In addition, the present invention provides for 1,1'-alkylene bis-hydantoins which have excellent antiseptic, germicidal and fungicidal activity. Furthermore, the 1,1'-alkylene bis-hydantoins of this invention are readily soluble in common solvents such as ethyl alcohol and/or water and therefore are especially useful in the preparation of solutions having antiseptic, germicidal and fungicidal activity which can be readily applied in the form of a spray.

The 1,1'-alkylene bis-hydantoins of the present invention have the following formula:

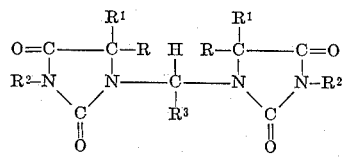

wherein: R and $R^1$, which can be the same or different, are hydrogen or alkyl groups, and when alkyl groups preferably containing from 1 to 3 carbon atoms inclusive, as for example, methyl, ethyl, isopropyl and n-propyl; $R^2$ is hydrogen or a hydrocarbon group, and when a hydrocarbon group, generally containing from 1 to 10 carbon atoms inclusive, and preferably containing from 1 to 6 carbon atoms inclusive, as for example, an alkyl group such as methyl, ethyl, n-propyl, n-pentyl, n-heptyl, n-decyl and the like; or an aryl group such as phenyl and the like; and $R^3$ is an alkyl group or a halo-substituted alkyl group wherein at least one of the hydrogen atoms of the alkyl group has been replaced with a halogen, i.e., chlorine, bromine, iodine or fluorine, and the number of carbon atoms in the alkyl or halo-substituted alkyl group is from 1 to 2 inclusive. Exemplary of suitable alkyl and halo-substituted alkyl groups for $R^3$ are methyl, ethyl, chloromethyl, dibromomethyl, α,α-dichloroethyl, α-bromo-β-chloroethyl and the like wherein the maximum number of halogen atoms substituted onto the alkyl group equals the number of replaceable hydrogen atoms.

Examples of 1,1'-alkylene bis-hydantoins included by the above given formula are:

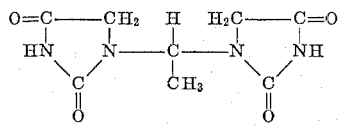

1,1'-(1,1-ethylidene bis-hydantoin)

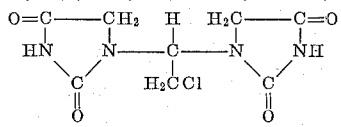

1,1'-[1,1-(2-chloroethylidene)bis-hydantoin]

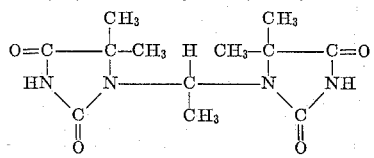

1,1'-[1,1-ethylidene bis-(5,5-dimethyl)hydantoin]

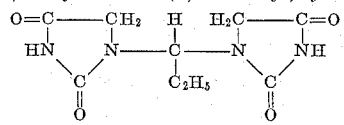

1,1'-(1,1-propylidene bis-hydantoin)

The method by which 1,1'-alkylene bis-hydantoins are produced is conducted by reacting a hydantoin with an acetal of an aliphatic aldehyde in a reaction medium containing an organic and an inorganic acid.

Hydantoins suitable as starting materials for conducting the method of this invention have the formula:

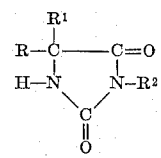

wherein R, $R^1$ and $R^2$ are as previously defined. Examples of specific hydantoins coming within the purview of the formula noted are: hydantoin, 5-methyl hydantoin, 5,5-dimethyl hydantoin, 3,5,5-trimethyl hydantoin, 3-methyl-5-ethyl hydantoin, 3-methyl-5,5-diethyl hydantoin, 3,5,5-triethyl hydantoin, 3,5-diethyl hydantoin, 5-n-propyl hydantoin, 5-isopropyl hydantoin, 3-methyl-5-ethyl-5-n-propyl hydantoin, 3-n-pentyl-5-methyl hydantoin, 3-n-hexyl-5-methyl-5-n-propyl hydantoin, 3-phenyl hydantoin, 3-phenyl-5-methyl hydantoin, 3-phenyl-5,5-diethyl hydantoin, and the like.

The acetals of aliphatic aldehydes suitable for reaction with the hydantoins in accordance with this invention have the formula:

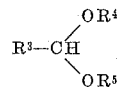

wherein $R^3$ is as previously defined and $R^4$ and $R^5$, which can be the same or different, are alkyl groups, generally containing from 1 to 20 carbon atoms inclusive, preferably containing from 1 to 3 carbon atoms inclusive, as for example methyl, ethyl, n-propyl, isopropyl, n-pentyl, n-nonyl, n-undecyl, n-eicosyl and the like. Specific acetals of aliphatic aldehydes coming within the scope of the formula noted are, among others: formaldehyde dimethylacetal, formaldehyde diethylacetal, formaldehyde dipropylacetal, acetaldehyde dimethylacetal, acetaldehyde diethylacetal, chloroacetaldehyde dimethylacetal, chloroacetaldehyde diethylacetal, bromoacetaldehyde diethylacetal, iodoacetaldehyde dipropylacetal, α-chloropropionaldehyde dimethylacetal, α,α-dichloropropionaldehyde dimethylacetal, and the like.

The preparation of 1,1'-alkylene bis-hydantoins by the reaction of a hydantoin with an acetal of an aliphatic aldehyde can be illustrated by the following equation:

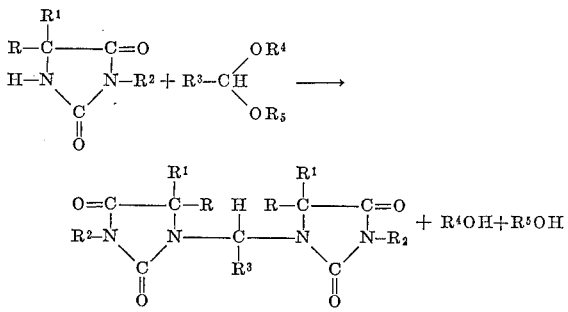

The ratio of reactants can vary over a wide range. Generally, about 0.1 mole to about 3 moles of acetal are employed for every mole of hydantoin. More than about 3 moles of acetal per mole of hydantoin can be employed if so desired  However, this is economically undesirable as the yield of 1,1'-alkylene bis-hydantoin is not materially increased. The preferred ratio of reactants is about 0.5 mole of acetal per mole of hydantoin.

The temperature at which the reaction is conducted is also not critical. The temperatures generally employed are those between about 20° C. and about 100° C. The optimum temperature range is about 40° C. to about 50° C.

The reaction can be carried out at atmospheric, subatmospheric or superatmospheric pressures. For convenience and economy, the reaction is generally carried out at atmospheric pressure.

The reaction between the hydantoin and the acetal, as stated, is conducted in a reaction medium containing both an organic acid and an inorganic acid, the organic acid being a liquid at the temperature at which the reaction is conducted, providing a reaction medium in which the reactants are brought into intimate contact, and the inorganic acid serving as a catalyst promoting the reaction of the hydantoin with the acetal.

Illustrative of organic acids which provide a suitable medium for the reaction of a hydantoin with an acetal are carboxylic acids, including, fatty acids having the formula:

$$(C_mH_{2m+1})-COOH$$

wherein $m$ is an integer having a value of from 0 to 20 inclusive, exemplary of which are formic acid, acetic acid, propionic acid, butyric acid, capric acid, caproic acid, lauric acid, palmittic acid, stearic acid and the like.

Halo-substituted fatty acids, such as chloroacetic acid, bromoacetic acid, chloropropionic acid, and the like, are also suitable. Other acids which can be used are: the monobasic unsaturated acids such as those having the formula:

$$(C_aH_{2a-1})-COOH$$

wherein $a$ is an integer having a value of from 2 to 20 inclusive, such as acrylic acid, crotonic acid, isocrotonic acid, vinylacetic acid, methylacrylic acid, tiglic acid, angelic acid, oleic acid, elaidic acid, brassylic acid, and the like; aromatic acids, exemplified by phenylacetic acid, ethylbenzoic acid, and the like; dibasic acids such as those having the formula:

$$HOOC-(CH_2)_x-COOH$$

wherein $x$ is an integer having a value of from 0 to 20 inclusive, exemplary of which are brassic acid, and the like; dibasic unsaturated acids such as those having the formula:

$$HOOC-(C_zH_{2z-2})-COOH$$

wherein $z$ is an integer having a value of from 2 to 20 inclusive, exemplary of which are citraconic acid, mesaconic acid, and the like.

Other suitable organic acids are the non-carboxylic acids such as: the organosulfonic acids, represented by methanesulfonic acid, ethanesulfonic acid, benzenesulfonic acid, and the like; the organosulfinic acids represented by ethanesulfinic acid, benzenesulfinic acid, and the like.

The amount of organic acid employed is sufficient to provide a reaction medium in which the reactants are intimately admixed. The amount generally employed is from about 100 ml. to about 1000 ml. per mole of hydantoin present. The preferred amount of organic acid used is about 300 ml. per mole of hydantoin.

Exemplary of suitable inorganic acids are the following: mineral acids, as for example, the strong mineral acids such as sulfuric acid, phosphoric acid, anhydrous hydrochloric acid and the like; oxidizing acids, as for example, strong oxidizing acids such as perchloric acid, perbromic acid, periodic acid, perfluoric acid, nitric acid, nitrous acid and the like. For purposes of this invention, sulfuric acid is preferred.

The inorganic acid is used in catalytic amounts, that is, in amounts sufficient to catalyze the reaction between the hydantoin and the acetal. The actual amount used is generally from about 0.15 mole to about 0.45 mole per mole of hydantoin and preferably about 0.2 mole per mole of hydantoin. More than about 0.45 mole of inorganic acid, per mole of hydantoin, can be used but the rate of the reaction is not materially increased.

Generally, the 1,1'-alkylene bis-hydantoin precipitates out of the reaction mixture and completion of the reaction is indicated when precipitation stops. In those cases wherein the 1,1'-alkylene bis-hydantoin is soluble in the reaction medium, precipitation of the product can easily be induced by the addition of the reaction medium to water. In both instances the 1,1'-alkylene bis-hydantoin can be recovered as a filter cake by a simple filtration operation.

In order to prepare crystals of the 1,1'-alkylene bis-hydantoin for analysis, the product is usually washed with about 100 ml. to about 1000 ml. of an organic acid such as previously defined, for example, acetic acid, and thereafter recrystallized from water and/or a mixture of ethyl alcohol and water containing about 5 percent by weight ethyl alcohol.

The hydantoins employed as starting materials are known compounds which are readily available. Substituted hydantoins are prepared by reacting an aldehyde or ketone with hydrogen cyanide and ammonium carbonate. Hydantoin itself is conveniently prepared by treating acetylenediurene with aqueous acid.

As previously stated, the 1,1'-alkylene bis-hydantoins of the present invention, i.e., those in which the alkylene group contains at least two carbon atoms, are useful as germicidal and antiseptic agents. In addition, the 1,1'-alkylene bis-hydantoins of the present invention are active against fungi. This property is unexpected and surprising in view of the fact that 1,1'-methylene bis-hydantoins do not exhibit fungicidal activity.

The following examples are given to illustrate certain preferred ways in which the present invention can be carried out and are not to be considered as limiting the present invention by the details set forth therein.

*Example 1*

To a mixture of 550 grams (5.5 moles) of hydantoin, 1500 ml. of acetic acid and 100 grams (1.0 mole) of sulfuric acid, there was added 193 grams (2.54 moles)

of formaldehyde dimethylacetal. This mixture was warmed to 50° C. and held at this temperature for 4 hours. After 4 hours the product which had precipitated was recovered as a filter cake. A total of 520 grams (97 percent) of product was collected. An analytical sample, prepared as colorless needles by recrystallization from water, had a melting point of 296° C.–305° C.

Analysis for 1,1'-methylene bis-hydantoin ($C_7H_8N_4O_4$): Found: C, 39.82; H, 3.91; N, 26.61. Calculated: C, 39.62; H, 3.80; N, 26.41.

*Example 2*

To a mixture of 128 grams (1.0 mole) of 5,5-dimethylhydantoin, 300 ml. of acetic acid, and 20 grams (0.2 mole) of sulfuric acid, there was added 38 grams (0.5 mole) of formaldehyde dimethylacetal. This mixture was heated for 2 hours at 50° C. The precipitated product was recovered by filtration. Sixty-nine grams of 1,1'-methylene bis(5,5-dimethylhydantoin) were recovered as colorless crystals. The melting point of the product after crystallization from water was determined to be 297° C.–305° C. The reported melting point for 1,1'-methylene bis-(5,5-dimethylhydantoin) is 295° C.–296° C. The infrared spectrum of the product was found to be identical to that of a sample prepared from 5,5-dimethylhydantoin and formaldehyde in a hydrochloric acid-zinc chloride mixture according to the procedure described in U.S. Patent No. 2,417,999, issued March 25, 1947, to J. F. Walker.

*Example 3*

To a mixture of 70 grams (0.5 mole) of 5-isopropylhydantoin, 200 ml. of acetic acid and 10 grams (0.1 mole) of sulfuric acid, there was added 19 grams (0.25 mole) of formaldehyde dimethylacetal. This mixture was heated to 50° C. for 5 hours, evaporated to about one-half of its original volume and then added to 800 ml. of water. An oil precipitated which slowly solidified. Thirty grams of 1,1'-methylene bis-(5-isopropylhydantoin) were obtained. The product, recrystallized from water and a mixture of 95 percent by weight water and 5 percent by weight ethanol as colorless needles, had a melting point of 225° C.–230° C.

Analysis for 1,1'-methylene bis-(5-isopropylhydantoin) ($C_{13}H_{20}N_4O_4$): Found: C, 51.16; H. 6.81; N, 18.48. Calculated: C, 52.69; H, 6.80; N, 18.91.

*Example 4*

To a mixture of 55 grams (0.55 mole) of hydantoin, 150 ml. of acetic acid, and 10 grams (0.1 mole) of sulfuric acid, there was added 30 grams (0.25 mole) of acetaldehyde diethylacetal. This mixture was stirred at 25° C. for 40 minutes and then stirred at 50° C. for 1.5 hours. After cooling the mixture to about 15° C., the product which had precipitated was isolated by filtration. Fifty-five grams (96 percent yield) of 1,1'(1,1-ethylidene bis-hydantoin) were recovered. The product was recrystallized from water in the form of long colorless needles having a melting point of 258° C.–261° C.

Analysis for 1,1(1,1 - ethylidene bis - hydantoin) ($C_8H_{10}N_4O_4$): Found: C, 42.49; H, 4.22; N, 25.32. Calculated: C, 42.48, H, 4.45; N, 24.77.

*Example 5*

To a mixture of 50 grams (0.5 mole) of hydantoin, 150 ml. of acetic acid and 20 grams (0.2 mole) of concentrated sulfuric acid, there was added 40 grams (0.26 mole) of chloroacetaldehyde diethylacetal. This mixture was heated to 50° C. for 4.5 hours. After cooling the mixture to about 15° C., the precipitated 1,1'[1,1-(2-chloroethylidene)-bis-hydantoin] was recovered by filtration, and air dried overnight at 20° C.–25° C. to give 45 grams (70 percent) of a white solid. A sample of this product was recrystallized from water in the form of prisms having a melting point of 204° C.–206° C.

Analysis for 1,1'-[1,1-(2-chloroethylidene)-bis-hydantoin] ($C_8H_9ClN_4O_4$): Found: C, 36.86; H, 3.48; N, 21.75. Calculated: C, 36.86; H, 3.48; N, 21.49.

What is claimed is:

1. A 1,1'-alkylidene bis-hydantoin having the formula:

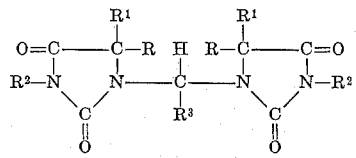

wherein R and $R^1$ are members selected from the group consisting of hydrogen and alkyl of 1 to 3 carbon atoms inclusive, $R^2$ is a member selected from the group consisting of hydrogen, alkyl of 1 to 10 carbon atoms inclusive and phenyl and $R^3$ is a halo-substituted alkyl of 1 to 2 carbon atoms inclusive.

2. A 1,1'-alkylidene bis-hydantoin as defined in claim 1 wherein R, $R^1$ and $R^2$ are hydrogen and $R^3$ is a halo-substituted alkyl of 1 to 2 carbon atoms inclusive.

3. A 1,1'-alkylidene bis-hydantoin as defined in claim 1 wherein R is hydrogen, $R^1$ is alkyl of 1 to 3 carbon atoms inclusive, $R^2$ is hydrogen and $R^3$ is a halo-substituted alkyl of 1 to 2 carbon atoms inclusive.

4. A 1,1'alkylidene bis-hydantoin as defined in claim 1 wherein R and $R^1$ are hydrogen, $R^2$ is alkyl of 1 to 10 carbon atoms inclusive and $R^3$ is a halo-substituted alkyl of 1 to 2 carbon atoms inclusive.

5. 1,1'-[1,1-(2-chloroethylidene)bis-hydantoin].

6. A method for preparing a 1,1'-alkylene bis-hydantoin which comprises reacting, as sole reactants, in an organic acid medium, a hydantoin having the formula:

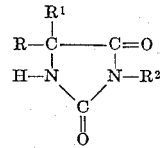

wherein R and $R^1$ are members selected from the group consisting of hydrogen and alkyl of 1 to 3 carbon atoms inclusive and $R^2$ is a member selected from the group consisting of hydrogen, alkyl of 1 to 10 carbon atoms inclusive and phenyl, an acetal of an aliphatic aldehyde in an amount of at least about 0.1 mole, per mole of said hydantoin, said acetal having the formula:

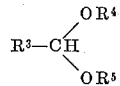

wherein $R^3$ is a member selected from the group consisting of hydrogen, alkyl and halo-substituted alkyl, said alkyl and halo-substituted alkyl having 1 to 2 carbon atoms inclusive, and $R^4$ and $R^5$ are alkyl of 1 to 20 carbon atoms inclusive, and an inorganic acid in an amount of at least about 0.15 mole, per mole of said hydantoin, to produce the said hydantoin.

7. A method as defined in claim 6 wherein the reaction is conducted at a temperature of from about 20° C. to about 100° C.

8. A method as defined in claim 6 wherein the reaction is conducted at a temperature of from about 40° C. to about 50° C.

9. A method as defined in claim 6 wherein the said inorganic acid is present in an amount of from about 0.15 mole to about 0.45 mole, per mole of said hydantoin.

10. A method as defined in claim 6 wherein the said organic acid is present in an amount of from about 100 ml. to about 1000 ml., per mole of said hydantoin.

11. A method as defined in claim 6 wherein the said acetal is present in an amount of from about 0.1 mole to about 3 moles, per mole of said hydantoin.

12. A method for preparing a 1,1'-alkylene bis-hydantoin which comprises reacting, as sole reactants, in an organic acid medium, at a temperature of from about 20° C. to about 100° C. a hydantoin having the formula:

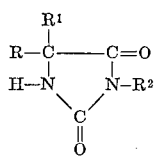

wherein R and $R^1$ are members selected from the group consisting of hydrogen and alkyl of 1 to 3 carbon atoms inclusive and $R^2$ is a member of the group consisting of hydrogen, alkyl of 1 to 10 carbon atoms inclusive and phenyl, an acetal of an aliphatic aldehyde in an amount of from about 0.1 mole to about 3 moles, per mole of said hydantoin, said acetal having the formula:

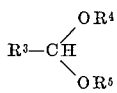

wherein $R^3$ is a member selected from the group consisting of hydrogen, alkyl and halo-substituted alkyl, said alkyl and halo-substituted alkyl of 1 to 2 carbon atoms inclusive and $R^4$ and $R^5$ are alkyl of 1 to 20 carbon atoms inclusive, and an inorganic acid in an amount of from about 0.15 mole to about 0.45 mole, per mole of said hydantoin, said organic acid being present in an amount of from about 100 ml. to about 1000 ml., per mole of said hydantoin.

References Cited by the Examiner
UNITED STATES PATENTS

| | | | |
|---|---|---|---|
| 2,398,599 | 4/1946 | Rogers | 260—309.5 |
| 2,417,999 | 3/1947 | Walker | 260—309.5 |
| 2,418,000 | 3/1947 | Walker | 260—309.5 |
| 2,502,548 | 4/1950 | Allen et al. | 260—309.5 |

OTHER REFERENCES

Fieser et al., Organic Chemistry, 2d ed., pages 216–17, Boston, Heath, 1950.

Hackh's Chemical Dictionary 3d ed., pages 418–19, Philadelphia, Blakeston, 1944.

WALTER A. MODANCE, *Primary Examiner.*

DUVAL T. McCUTCHEN, NICHOLAS S. RIZZO,
*Examiners.*